(12) United States Patent
Eulitz et al.

(10) Patent No.: US 10,086,687 B2
(45) Date of Patent: Oct. 2, 2018

(54) FUEL TANK OF THERMOPLASTIC POLYMER FOR A MOTOR VEHICLE AND METHOD FOR THE PRODUCTION OF A FUEL TANK

(75) Inventors: Dirk Eulitz, Bonn (DE); Ulrich Karsch, Niederkassel (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 14/007,078

(22) PCT Filed: Mar. 3, 2012

(86) PCT No.: PCT/EP2012/000963
§ 371 (c)(1),
(2), (4) Date: Sep. 24, 2013

(87) PCT Pub. No.: WO2012/126569
PCT Pub. Date: Sep. 27, 2012

(65) Prior Publication Data
US 2014/0014663 A1    Jan. 16, 2014

(30) Foreign Application Priority Data
Mar. 24, 2011  (DE) .......................... 10 2011 015 049

(51) Int. Cl.
*B60P 3/00*   (2006.01)
*B62D 33/00*  (2006.01)
(Continued)

(52) U.S. Cl.
CPC .............. *B60K 15/03* (2013.01); *B29C 49/04* (2013.01); *B29C 49/20* (2013.01); *B29C 65/028* (2013.01);
(Continued)

(58) Field of Classification Search
CPC .... B60K 2015/03493; B60K 15/03177; B60K 2015/03467; F17C 2201/0147
(Continued)

(56) References Cited

U.S. PATENT DOCUMENTS 1,757,923 A * 5/1930 Russell ......................... 220/653
3,368,708 A * 2/1968 Pflederer ...................... 220/590
(Continued)

FOREIGN PATENT DOCUMENTS

DE         3131040 A1    3/1983
WO      2008003387 A1    1/2008

OTHER PUBLICATIONS

PCT Written Opinion dated Oct. 4, 2012, received in corresponding PCT Application No. PCT/EP12/00963, 5 pgs.
(Continued)

*Primary Examiner* — Andrew T Kirsch
(74) *Attorney, Agent, or Firm* — Grossman, Tucker, Perreault & Pfleger, PLLC (57) ABSTRACT

The invention relates to a fuel tank of thermoplastic polymer for a motor vehicle, having at least one reinforcing element inside the fuel tank, the reinforcing element inside the fuel tank extending between opposing tank walls (15), parts of the reinforcing element passing through the tank wall and parts of the reinforcing element engaging behind the tank wall from outside, the fuel tank being distinguished according to the invention in that the reinforcing element (8) is provided with at least one multipart fastening head (11), which comprises a first closing means engaging through the tank wall (15) from inside and a second closing means engaging through the tank wall (15) from outside, which closing means are of mutually complementary construction.

18 Claims, 4 Drawing Sheets

(51) Int. Cl.
- B65D 88/12 (2006.01)
- B65D 1/42 (2006.01)
- B65D 6/34 (2006.01)
- B65D 8/08 (2006.01)
- F17C 1/02 (2006.01)
- F17C 1/08 (2006.01)
- B60K 15/03 (2006.01)
- B29C 49/20 (2006.01)
- B29C 65/56 (2006.01)
- B29C 65/00 (2006.01)
- B29C 49/04 (2006.01)
- B29C 65/02 (2006.01)
- B65D 6/00 (2006.01)
- B29L 31/00 (2006.01)
- B29K 23/00 (2006.01)
- B29C 51/00 (2006.01)
- B29K 677/00 (2006.01)

(52) U.S. Cl.
CPC .......... *B29C 65/56* (2013.01); *B29C 65/561* (2013.01); *B29C 66/02242* (2013.01); *B29C 66/122* (2013.01); *B29C 66/131* (2013.01); *B29C 66/532* (2013.01); *B29C 66/61* (2013.01); *B29C 66/723* (2013.01); *B29C 66/73921* (2013.01); *B29C 66/83221* (2013.01); *B60K 15/03177* (2013.01); *B65D 11/00* (2013.01); *B29C 51/00* (2013.01); *B29C 66/1312* (2013.01); *B29C 66/54* (2013.01); *B29C 66/71* (2013.01); *B29C 66/7234* (2013.01); *B29C 2049/2013* (2013.01); *B29C 2049/2043* (2013.01); *B29K 2023/065* (2013.01); *B29K 2623/065* (2013.01); *B29K 2677/00* (2013.01); *B29L 2031/7172* (2013.01); *B60K 2015/03032* (2013.01); *B60K 2015/0346* (2013.01); *B60K 2015/03453* (2013.01); *B60K 2015/03467* (2013.01)

(58) Field of Classification Search
USPC ......... 220/562, 592, 647, 651, 653; 229/187
See application file for complete search history.

(56) References Cited

U.S. PATENT DOCUMENTS

| | | | | |
|---|---|---|---|---|
| 3,774,802 | A * | 11/1973 | O'Cheskey | 220/694 |
| 3,883,031 | A * | 5/1975 | McMillan | 220/653 |
| 4,143,193 | A * | 3/1979 | Rees | 220/555 |
| 4,517,231 | A * | 5/1985 | May et al. | 428/36.92 |
| 5,193,262 | A * | 3/1993 | Hyde et al. | 29/447 |
| 5,474,207 | A * | 12/1995 | Nouhra | 220/653 |
| 6,135,306 | A | 10/2000 | Clayton et al. | |
| 6,857,537 | B2 * | 2/2005 | Yonezawa | 220/562 |
| 6,978,802 | B2 | 12/2005 | Hagano et al. | |
| 2004/0239112 | A1 * | 12/2004 | Kertesz | 285/288.1 |
| 2005/0011891 | A1 * | 1/2005 | Austerhoff et al. | 220/4.12 |
| 2007/0290414 | A1 * | 12/2007 | Criel | 264/531 |
| 2008/0078761 | A1 | 4/2008 | Borchert et al. | |
| 2008/0290564 | A1 | 11/2008 | Wolter | |
| 2009/0206097 | A1 | 8/2009 | Gebert et al. | |
| 2010/0032436 | A1 * | 2/2010 | Gebert et al. | 220/601 |
| 2012/0024868 | A1 * | 2/2012 | Menke | 220/653 |
| 2012/0138606 | A1 | 6/2012 | Varga | |

OTHER PUBLICATIONS

PCT International Search Report dated Oct. 4, 2012, received in corresponding PCT Application No. PCT/EP12/00963, 4 pgs.

* cited by examiner

FUEL TANK OF THERMOPLASTIC POLYMER FOR A MOTOR VEHICLE AND METHOD FOR THE PRODUCTION OF A FUEL TANK

The invention relates to a fuel tank of thermoplastic polymer for a motor vehicle, having at least one reinforcing element inside the fuel tank, the reinforcing element inside the fuel tank extending between two opposing tank walls, parts of the reinforcing element passing through the tank walls and parts of the reinforcing element engaging behind the tank walls from outside.

Such a fuel tank is known for example from DE 10 2008 009 829 A1.

Fuel tanks of thermoplastic polymer are almost without exception made on the basis of HDPE (High Density Polyethylene). Multilayer extrudates are used here, with barrier layers for hydrocarbons which take account of the incomplete resistance of polyethylene to hydrocarbons. It should be mentioned at this point that instead of using co-extrudates based on HDPE with barrier layers for hydrocarbons, single-layer extrudates are also used, which have been made resistant by chemical treatment, for example by sulphonation or fluorination on the inside of the tank, against hydrocarbon diffusion through the material.

In terms of processability and stability, HDPE has proven a particularly suitable material for producing fuel tanks. HDPE is sufficiently dimensionally stable and resistant, in particular even in the event of impact, such as may occur for example in a motor vehicle in the event of a collision.

The use of HDPE as a material for producing thermoplastic polymer tanks is however associated with the disadvantage that HDPE has a certain tendency to creep when exposed to pressure for a prolonged period. The polymer's tendency to creep is more a function of time than of absolute pressure.

Fuel tanks are conventionally very largely operated in a pressureless manner. Pressureless in this context should be understood to mean a system pressure of generally −30 to +100 mbar, relative to atmospheric pressure. The pressure conditions in the fuel tank may change for example due to filling and emptying, temperature fluctuations, movements of the fuel in the fuel tank and the like. To ensure a pressureless fuel tank, the pressure changes are equalized by way of venting valves and lines. Venting conventionally proceeds to the atmosphere via an activated carbon filter. Such an activated carbon filter is normally backflushed at regular intervals during operation of the internal combustion engine, this being achieved by drawing combustion air for the internal combustion engine in via the activated carbon filter.

In hybrid vehicles the possibility of flushing the activated carbon filter is limited, since the combustion engine is only switched on in certain driving situations. This means that in hybrid vehicles operating situations may predominate in which it is advantageous for the fuel tank to be closed. In this case, a slightly elevated internal pressure may arise within the fuel tank, even over extended periods. For such vehicles it is therefore necessary to make the fuel tank correspondingly pressure-resistant. This problem has already been described in the above-mentioned DE 10 2008 009 829 A1 with further references to the prior art.

To solve this problem it is for example proposed in DE 2008 009 829 A1 to provide a fuel tank for motor vehicles of thermoplastic polymer with at least one reinforcing element inside the fuel tank, the reinforcing element extending in such a way between two opposing tank walls that it counteracts deformation caused by internal pressure in the fuel tank. In this case, it is in particular provided for two ends of the reinforcing element arranged inside the fuel tank to engage behind the tank wall from outside. This has the advantage that the joint between reinforcing element and tank wall is only exposed to pressure, whereby the polymer's tendency to creep is counteracted in the region of the joint between reinforcing element and tank wall.

The reinforcing element according to DE 10 2008 009 829 A1 is constructed as a multipart conveying unit, the conveying unit extending between opposing aligned, relatively large openings in the tank wall, and the conveying unit being supported against the tank outer wall in each case on opposing sides of the tank wall with a flange-like fastening collar.

This arrangement requires a relatively large amount of structural space inside the tank, which, though not taking up any appreciable tank volume due to fuel flow therethrough, does require the provision of relatively large openings which have a destabilizing effect on the tank wall as a whole. The fuel tank according to DE 10 2008 009 829 A1 is constructed overall such that introduction of the reinforcing element in the form of a conveying unit has at any rate to take place after production of the tank or the tank cavity. The reinforcing element is moreover such that in the case of a single fuel tank just one thereof may be provided, whereas in a saddle tank with two or more large tank spaces if need be two such reinforcing elements may be provided in the tank.

It is also known in principle to introduce reinforcing elements in the form of simple bracing elements into the fuel tank during production thereof. These bracing elements, known as "stand offs", may for example have been introduced into the fuel tank by extrusion blow moulding during production thereof from a plurality of web or strip-shaped preforms. Such a method is known for example from DE 10 2006 031 902 A1. This method relates to the production of fuel tanks from thermoplastic polymer, in which web or strip-shaped preforms of plasticized polymer are shaped in a multipart mould forming a cavity by expansion and application of the preforms against the inner contour of the cavity, wherein the method firstly comprises the formation of two mutually complementary intermediate products in the form of shells, an insert being fastened to each of the inner sides of the shells facing one another in the installation position, and wherein at least some of the inserts of mutually complementary shells are in each case of mutually complementary construction, in such a way that they may be connected to form an assembled component or a functional unit, and furthermore the shells are joined together in such a way that the mutually complementary inserts engage in one another or enter into active connection with one another. In the case of DE 10 2006 031 902 A1, to the full contents of which reference is made here, also for the purpose of disclosure, in particular with regard to the production method for the fuel tank, mutually complementary bracing members stabilizing the hollow body are provided as inserts, said members being latched together on connection of the shells.

The fuel tank described in DE 10 2006 031 902 A1 does not entail the above-described disadvantages. It has however been found that certain limits are also set to the pressure resistance of such a fuel tank. In the method according to DE 10 2006 031 902 A1 the bracing members provided as inserts are welded or riveted to the still hot and plastic internal wall of the shells. Tests with such a fuel tank have shown that such joints are under certain circumstances also impaired by the thermoplastic polymer's tendency to creep under prolonged exposure to pressure.

The object of the invention is therefore to improve a fuel tank of the above-mentioned type with regard to making it particularly simple to produce and with regard to durable pressure resistance. The object of the invention is furthermore to provide a method for the production of such a fuel tank.

The object is firstly achieved by a fuel tank of thermoplastic polymer for a motor vehicle, having at least one reinforcing element inside the fuel tank, the reinforcing element inside the fuel tank extending between two opposing tank walls, parts of the reinforcing element passing through the tank wall and parts of the reinforcing element engaging behind the tank wall from outside, the fuel tank being distinguished according to the invention in that the reinforcing element is provided with at least one multipart fastening head, which comprises a first closing means engaging through the tank wall from inside and a second closing means engaging through the tank wall from outside, which closing means are of mutually complementary construction. Such a fuel tank has the particular advantage that large-area, mutually aligned circular cut-outs or openings in opposing wall areas of the fuel tank are not required. Furthermore, the fuel tank according to the invention combines the merits of the "stand off" introduced on the inside of the tank, as described for example in DE 10 2006 031 902 A1, with the merits of the fuel tank from DE 10 2008 009 829 A1, in which the connecting element is supported on both sides against the tank outer wall.

This is achieved according to the invention also in that a second closing means engaging through the tank wall from outside is provided, which interacts with the first closing means in a form-fitting and/or bonded manner such that the closing means preferably clamp the tank walls between them.

In a particularly preferred variant of the fuel tank according to the invention the closing means are screwed together.

Alternatively, provision may be made for the closing means to be latched together, in this case for example the closing means engaging from outside through the tank wall may be latched to the first closing means in the manner of a pushbutton.

The second closing means engaging through the tank wall from outside may additionally or alternatively be welded or adhesively bonded to the first closing means. Furthermore, the second closing means may interact with the first closing means in a form-fitting manner, or on the other hand may have been welded to the tank outer wall by a collar engaging over the tank outer wall.

Finally the second closing means may be welded to the tank outer wall and engage with a pin in a corresponding recess in the first closing means, wherein a latched connection, adhesive bond or weld does not necessarily have to be provided in the region of penetration of the closing means.

In a convenient variant of the fuel tank according to the invention, provision is made for the fastening head of the reinforcing element to be welded to the tank inner wall.

To this end, the fastening head comprises at least one welding collar, which is welded all round to the tank inner wall in the region of a feed-through through the tank wall, such that the feed-through is reliably sealed.

To achieve a sufficiently diffusion-tight/gas-tight seal, additional sealing measures may be provided in the region of the feed-through. For example, a bonded joint with the fastening head may also be provided within the feed-through.

In a particularly convenient variant of the fuel tank according to the invention, provision is made for the first closing means to take the form of a sleeve-type extension of the fastening head engaging through the tank wall, into which a closing member engaging from outside behind the tank wall is inserted as second closing means. In this case the connection is conveniently made such that the tank wall is sealed by the weld in the region of the feed-through, whereas, in the case of deformation of the tank wall as a result of pressure, the second closing means brings about support of the tank wall from outside, wherein at least a proportion of the forces is introduced into the reinforcing element as tensile forces. In any case the joint between reinforcing element and tank wall is only exposed to pressure, whereby the polymer's tendency to creep is largely stopped in the region of the joint between reinforcing element and tank wall.

In a particularly convenient configuration of the fuel tank according to the invention, provision is made for the sleeve-type extension to be provided with a threaded bush, into which the closing member engages with a threaded pin of complementary construction. Provision may additionally be made for the closing member to be welded to the tank outer wall, or for the threaded pin to be adhesively bonded and/or welded to the threaded bush. In a particularly convenient variant of the fuel tank according to the invention, provision is made for the reinforcing element to be formed as a multi-component element of at least two different thermoplastic polymers, at least one component being a thermoplastic polymer which is compatible with the tank wall with regard to weldability.

For example, parts of the fastening head, which form the thread, and the closing member may consist of a particularly dimensionally stable, creep-resistant polymer, such as for example a polyamide. This also relates in particular to the threaded bush of the fastening head. The welding collar may on the other hand consist of a polyethylene. The tank wall of the fuel tank according to the invention likewise consists at least primarily of a polyethylene, it preferably taking the form of a multilayer co-extrudate based on HDPE (High Density Polyethylene).

The reinforcing element conveniently takes the form of a multipart wall-to-wall bracing element and is composed of at least two bracing parts. Conveniently the reinforcing element according to the invention extends between large-area wall regions of the fuel tank, which are conventionally exposed more severely to pressure-related deformation than smaller-area wall regions of the fuel tank.

The reinforcing element or the bracing parts may also take the form of hollow tubular elements, which form a channel for accommodating lines or for venting the tank. Alternatively such a channel may also accommodate hydraulic or electrical outlets. Also feasible is an embodiment with integrated bubble section.

The bracing parts are conveniently joined together by screw, bayonet, plug-in, snap or latching connection.

The object underlying the invention is furthermore achieved by a method for the production of a fuel tank, the method comprising the following method steps:
  extruding web-shaped preforms from thermoplastic polymer,
  moulding the preforms in a multipart mould to yield shells,
  introducing at least parts of at least one reinforcing element into the shells before or during joining together of the shells to yield a closed tank, parts of the reinforcing element passing through the wall of at least one shell and being welded thereto, and finishing the reinforcing element with at least one closing means engaging through the wall from outside during or after joining together of the shells.

In a preferred variant, the method according to the invention provides for two web-shaped preforms to be extruded, which web-shaped preforms are shaped in a multipart mould, the mould comprising at least two outer moulds and at least one middle mould, which effect an opening and closing movement relative to one another, the outer moulds each forming the contours of partial cavities determining the contours of the shells and the middle mould being provided with at least one component holder, at least one reinforcing element or bracing part being placed or fastened on the inside of the shells after moulding of the shells.

After placing for example two bracing parts on the insides of the shells, the middle mould between the outer moulds is removed, the outer moulds then being capable of being closed against one another, such that the shells and the bracing parts placed on the insides of the shells come into active connection with one another.

In a particularly preferred variant of the method, on introduction of a reinforcing element or bracing part into the wall of a shell, the wall is perforated while hot and plastic by part of the reinforcing element or bracing part, for example into a corresponding recess in the mould, the reinforcing element being welded to the wall at the same time.

Preferably a bracing part of a multipart reinforcing element is introduced in each case into a shell of a tank assembled from two shells and the bracing parts preferably of mutually complementary construction are brought into active connection with one another on joining together of the shells, i.e. brought into form-fitting engagement with one another, in such a way that the reinforcing element may overall transfer tensile forces.

Preferably perforation of the wall of the shells takes place with the assistance of at least one cutting head which is removable from the reinforcing element or expendable.

As has already been mentioned above, moulding of the preforms conveniently proceeds using differential pressure and exploiting the extrusion heat in an extrusion blow mould.

The invention will be explained below with reference to an exemplary embodiment shown in the drawings, in which.

Figure 1:
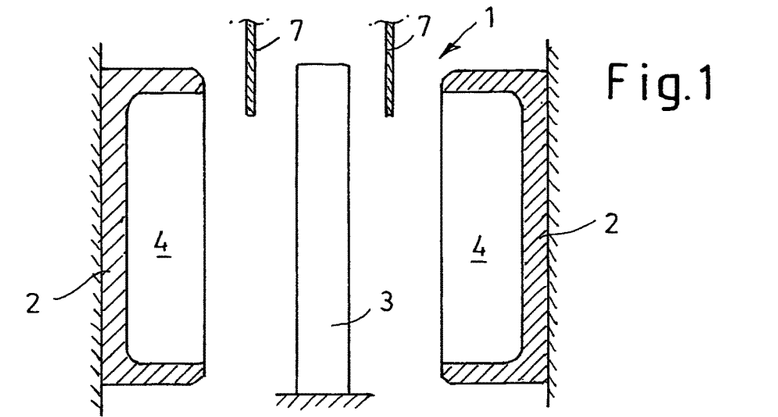
FIGS. 1, 2 and 6 are highly schematic representations of the extrusion blow moulding method for producing the fuel tank according to the invention, FIGS. 3a+3b are schematic representations, which show perforation of the wall of the shells by means of tools provided for this purpose, FIGS. 4a+4b are schematic representations which illustrate placing or introduction of the bracing parts into the shells, and FIGS. 5a+5b are schematic representations which show the bracing parts assembled to yield a reinforcing element in the finished tank and insertion of the closing bodies into the reinforcing element.
Figure 2:
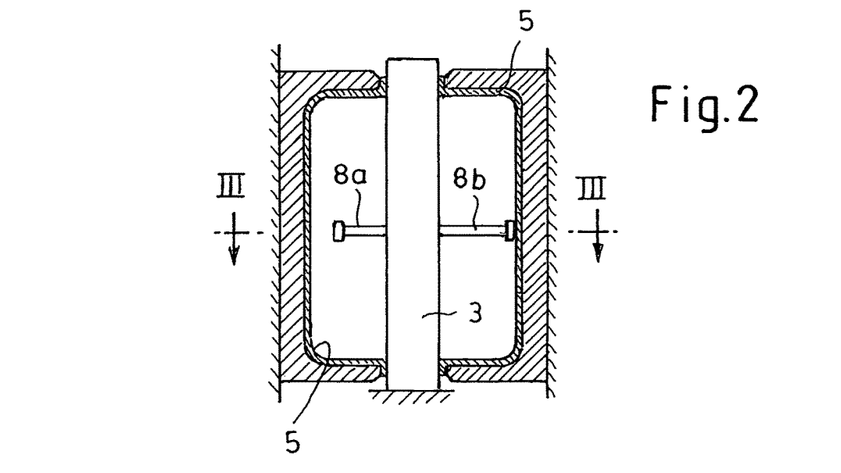
Figure 6:
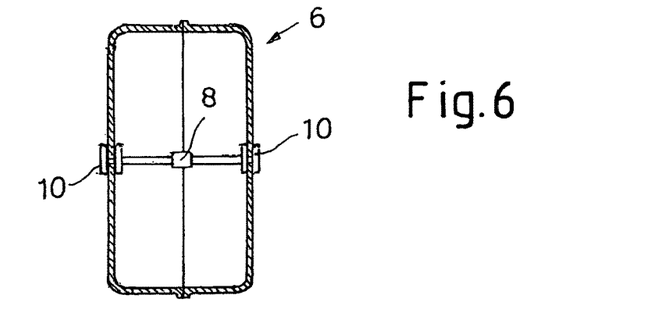

Reference is firstly made to FIGS. 1, 2 and 6, which illustrate the method for the production of the fuel tank according to the invention.

FIG. 1 shows a partial section through the extrusion blow mould 1 according to the invention, comprising two outer moulds 2 and a central frame 3, wherein the outer moulds 2 are displaceable towards and away from the central frame 3 in opening and closing movements. The central frame 3, on the other hand, may be displaced transversely of this opening and closing movement of the outer moulds 2, i.e. into and out of the plane of the drawing. The outer moulds 2 each form partial cavities 4, which define the contour of the finished product or which define the contour of shells to be produced 5 as intermediate products in the production of a fuel tank 6.

Reference numeral 7 denotes web-shaped preforms, which are introduced between the open parts of the extrusion blow mould 1.

At this point it should be noted that the fuel tank 6 according to the invention does not necessarily have to be produced by extrusion blow moulding, but instead the shells 5 may for example have been produced by injection moulding or thermoforming, joining of the shells 5 to yield a finished fuel tank 6 possibly proceeding for example after the introduction of inserts also with partial, i.e. local reheating of the shells. In the production method described herein, the outer moulds 2 are closed against the central frame 3 when the preforms 7 extend over their entire length between the outer moulds 2 and the central frame 3. Closure of the extrusion blow mould 1, i.e. closure of outer moulds 2 against the central frame 3, results in sealing of the partial cavities 4, such that moulding of the preforms 7 into shells 5 may proceed with the application of differential pressure. "With the application of differential pressure" means with the application of a vacuum and/or with the application of internal overpressure.

Component holders, not described in any greater detail, are arranged inside the central frame 3, by means of which, in the arrangement shown in FIG. 2, inserts may be applied or joined to the inside of the partially moulded shells 5. Functional components of the fuel tank 6 to be produced, such as for example pumps, transducers, valves or the like or indeed bracing elements, reinforcing elements etc., are conceivable inserts.

In the case of the exemplary embodiment described herein, bracing parts 8a, 8b are placed as inserts on the inner sides of the shells 5, said inserts being joined together in the finished fuel tank 6 to yield a continuous reinforcing element 8. This reinforcing element may also be known as a "stand off" or as a "tie rod". Once the bracing parts 8a, 8b have been joined to the inside of the shells 5, the extrusion blow mould 1 is opened, the central frame 3 is displaced into or out of the plane of the drawing between the outer moulds 2 and the outer moulds are closed against one another, wherein the shells 5 are finally blown at their edges to produce a closed fuel tank 6 with application of appropriate pressure to the outer moulds and with application of an appropriate differential pressure to a closed tank. After producing the fuel tank 6 and removing the latter from the extrusion blow mould, the bracing parts 8a, 8b, which are assembled in this state to produce a continuous reinforcing element 8, are finished from outside with a closing means engaging through the tank wall in the form of a closing member provided with a threaded pin 9. As is clear in particular from FIGS. 4a and 4b, each bracing part 8a, 8b is provided with a fastening head 11, which comprises a sleeve-type extension 12 with a threaded bush 13. On the side of the extension 12 facing the tank inside, a circumferential collar 14 is provided, which is intended for welding to the tank wall 15 or to the wall of the shells 5. In the exemplary embodiment shown the fastening head 11 takes the form of a "2-component element", i.e. it consists of two components, wherein the bracing part 8a, with the one-piece fastening head 11 including the extension 12 and the collar 14, consists of HDPE, whereas the threaded bush 13 takes the form of an insert of polyamide. The threaded bush 13 is inserted in a form-fitting manner into the fastening head 11. Mutual connection of the two components of the fastening head 11 is not shown in detail. In principle, the bracing part 8a, 8b may consist completely of a polyamide and be provided with a collar 14 of HDPE.

Figure 4A:
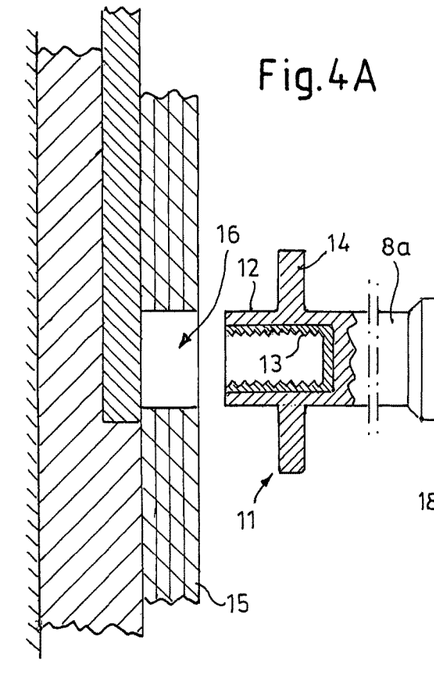
Figure 4B:
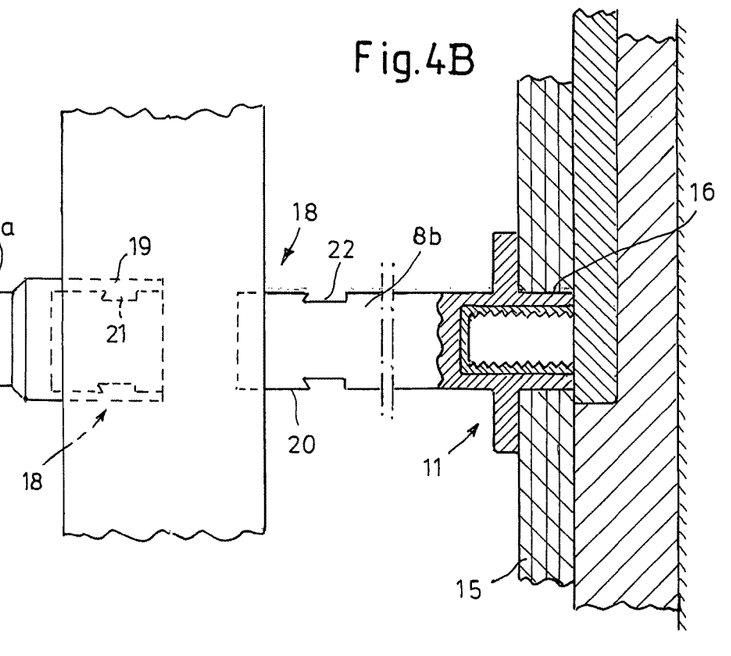

The height of the extension 12 from the leading end thereof to for instance the collar 14 corresponds approximately to the thickness of the tank wall 15.

Immediately after moulding the shells 5, a bracing part 8a, 8b is inserted into each of the shells 5 at an appropriate point, wherein the extension 12 engages or passes through an opening 16 in the tank wall 15 to such an extent that the collar 14 comes to rest against the tank wall 15. In this case, the fastening head 11 is welded and sealed to the tank wall 15 via the collar 14.

The opening 16 in the tank wall 15 may then be provided either by means of a cutting head to be placed on the fastening head 11, which is lost or removed after perforation of the tank wall, or the opening 16 in the tank wall 15 may be produced by means of a separate tool 17a with cutting head 17. This is indicated in FIGS. 3a and 3b.

Figure 5A:
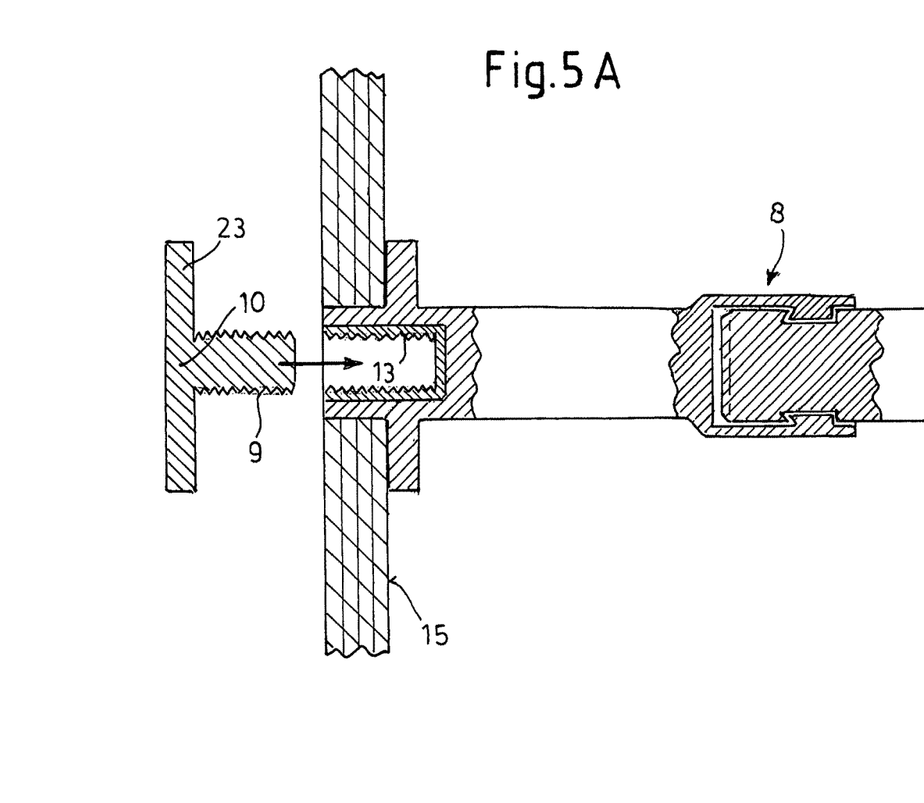
Figure 5B:
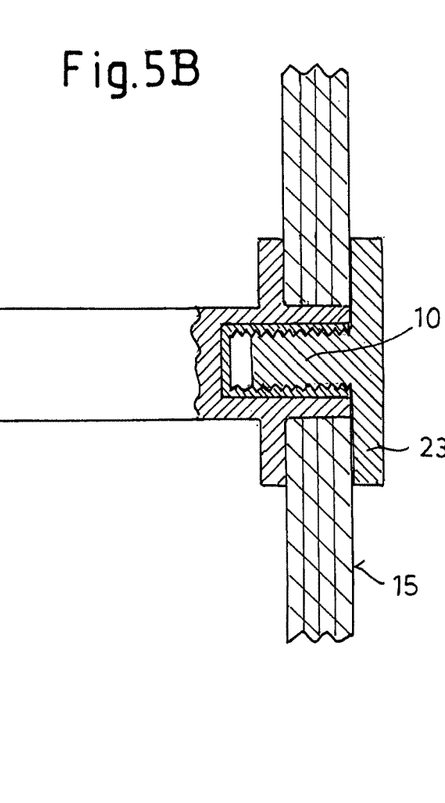

If the tank wall 15 is pierced by the extension 12 itself, it should be ensured that material removed from the tank wall 15 by piercing does not enter the threaded bush 13, such that the latter is ultimately freely accessible from outside the fuel tank 6, as shown for example in FIGS. 5a and 5b.

Figures 3A, 3B:
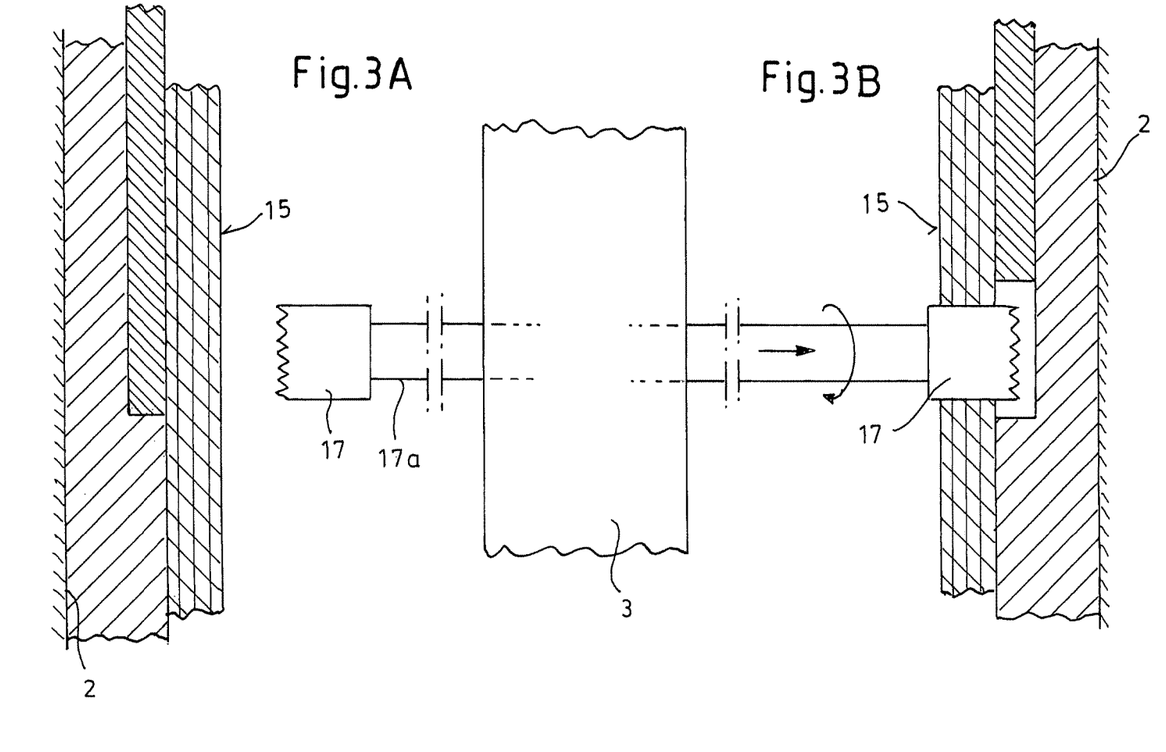

Perforation of the tank wall 15 both by means of the bracing parts 8a, 8b and by means of a separate tool, as indicated in FIGS. 3a and 3b, may be performed using appropriate, for example pneumatically or hydraulically displaceable actuating elements/component holders within the central frame 3.

After insertion of the bracing parts 8a, 8b at mutually facing and, in the finished tank, mutually aligned passages/openings in the tank wall 15, the central frame between the outer moulds 2 is removed and the outer moulds 2 are closed against one another, such that the shells 5 are joined and welded together in each case at circumferential flange-like edges to yield the finished fuel tank 6. At the same time, the bracing parts 8a, 8b are joined together at mutually facing fastening ends 18 to yield the reinforcing element 8. In the exemplary embodiment illustrated, the fastening ends 18 take the form on the one hand of a coupling sleeve 19 and on the other hand of a pin 20. The coupling sleeve 19 is provided with latching projections 21, whereas the pin 20 is provided with corresponding latching recesses 22. The bracing part 8a is provided with a coupling sleeve 19, the bracing part 8b on the other hand with a pin 20. The latching projections 21 on the coupling sleeve 19 are complementary to the latching recesses 22 on a pin 20.

Once the shells 5 and the bracing parts 8a, 8b have been joined together, the closing members 10 are screwed from outside with their threaded pins 9 into the threaded bushes 13 of the bracing parts 8a, 8b, as shown in FIGS. 5a and 5b. The closing members 10 likewise conveniently consist of a polyamide.

The closing members 10 each form a collar 23 or a disc-type closing cap, which engages behind the tank wall 15 from outside, such that the tank wall 15 is clamped between the collar 23 and the collar 14 of the extension 12. The collar 23 of the closing member 10 engages behind the tank wall 15 such that the tank wall is only exposed to pressure and the resultant forces are introduced into the reinforcing element 8. Reliable sealing of the openings 16 or feed-throughs through the tank wall 15 proceeds by circumferential welding of the collar 14 on the inside of the tank.

LIST OF REFERENCE SIGNS

1 Extrusion blow mould
2 Outer moulds
3 Central frame
4 Partial cavities
5 Shells
6 Fuel tank
7 Preforms
8 Reinforcing element
8a, 8b Bracing parts
9 Threaded pin
10 Closing member
11 Fastening head
12 Extension
13 Threaded bush
14 Collar
15 Tank wall
16 Opening
17 Cutting head
17a Tool
18 Fastening ends
19 Coupling sleeve
20 Pin
21 Latching projections
22 Latching recesses
23 Collar, closing member

What is claimed is:

1. A fuel tank, comprising:
the fuel tank being a motor vehicle fuel tank and formed of thermoplastic polymer; and
at least one tie rod inside the fuel tank, configured to support the fuel tank against outward deformation in response to a pressure increase within the fuel tank, the tie rod inside the fuel tank extending between two opposing tank walls, the tie rod passing through a first tank wall of the opposing tank walls and engaging behind the first tank wall from outside,
wherein the tie rod includes at least one bracing part and at least one closing member, wherein the bracing part has a first closing means moveable into and engaging through a feed-through opening in the first tank wall from inside, the feed-through opening configured to receive the first closing means within the feed-through opening, and the closing member includes a second closing means moveable into and engaging through the feed-through opening in the first tank wall from outside, the feed-through opening configured to receive the second closing means within the feed-through opening, wherein the first closing means and the second closing means are fastened together and occupy the feed-through opening in the first tank wall,
wherein the tie rod has at least one collar positioned on an inner side of the first tank wall, wherein the collar is formed as one-piece with the bracing part and has a diameter larger than a diameter of the feed-through opening in the first tank wall,
wherein the at least one bracing part and the at least one closing member are separately formed components of the tie rod which are fastened to one another.

2. The fuel tank according to claim 1, wherein the first and second closing means clamp the first tank wall between them.

3. The fuel tank according to claim 1, wherein the first and second closing means are screwed together.

4. The fuel tank according to claim 1, wherein the first and second closing means are latched together.

5. The fuel tank according to claim 1, wherein the closing member is welded to an outer portion of the first tank wall.

6. The fuel tank according to claim 1, wherein the bracing part is welded to an inner portion of the first tank wall.

7. The fuel tank according to claim 6, wherein the collar of the bracing part is welded to the inner portion of the first tank wall in a region of the feed-through opening in the first tank wall.

8. The fuel tank according to claim 1, wherein the first closing means comprises a sleeve-type extension, engaging through the feed-through opening in the first tank wall, into which extension the closing member engaging through the feed-through in the first tank wall from outside behind the first tank wall is inserted as the second closing means.

9. The fuel tank according to claim 8, wherein the sleeve-type extension is provided with a threaded bush, with which the closing member engages with a pin of complementary construction.

10. The fuel tank according to claim 1, wherein the tie rod is formed as a multi-component element of at least two different thermoplastic polymers, at least one component of which is a thermoplastic polymer which is compatible with the first tank wall with regard to weldability.

11. The fuel tank according to claim 1, wherein the tie rod has a form of a multipart wall-to-wall bracing element and comprises at least two bracing parts.

12. The fuel tank according to claim 11, wherein the bracing parts are joined together by at least one of a screw, bayonet, plug-in, snap and latching connection.

13. The fuel tank according to claim 1, wherein the tie rod passing through a second tank wall of the opposing tank walls and engages behind the second tank wall from outside.

14. Method for the production of a fuel tank according to claim 1, comprising the following method steps:
   extruding web-shaped preforms from thermoplastic polymer,
   moulding the preforms in a multipart mould to yield shells,
   introducing at least parts of at least one reinforcing element into the shells before or during joining together of the shells to yield a closed tank, parts of the reinforcing element passing through the wall of at least one shell and being welded thereto, and
   finishing the reinforcing element with at least one closing means engaging through the wall from outside during or after joining together of the shells.

15. Method according to claim 14, characterized in that, on introduction of a reinforcing element into the wall of a shell, the wall is perforated while still hot and plastic by part of the reinforcing element, the reinforcing element being welded to the wall at the same time.

16. Method according to claim 14, characterized in that a bracing part of a multipart reinforcing element is introduced in each case into a shell of a tank assembled from two shells and in that the bracing parts are brought into active connection with one another on joining together of the shells.

17. Method according to claim 14, characterized in that perforation of the wall of the shells takes place with the assistance of at least one cutting head which is removable from the reinforcing element or expendable.

18. Method according to claim 14, characterized in that moulding of the preforms proceeds in an extrusion blow mould using differential pressure and exploiting the extrusion heat.

* * * * *